United States Patent

Yamamoto et al.

[15] 3,703,295

[45] Nov. 21, 1972

[54] MAGNETIC RECORDING AND REPRODUCING APPARATUS

[72] Inventors: Kozo Yamamoto, Hirakata-shi; Takehisa Takamiya, Osaka, both of Japan

[73] Assignee: Matsushita Electric Industrial Co., Ltd., Osaka, Japan

[22] Filed: Dec. 2, 1969

[21] Appl. No.: 881,380

[30] Foreign Application Priority Data

| | | |
|---|---|---|
| Dec. 9, 1968 | Japan | 43/91274 |
| Dec. 9, 1968 | Japan | 43/91275 |
| Dec. 9, 1968 | Japan | 43/91276 |
| Dec. 9, 1968 | Japan | 43/91277 |
| Dec. 9, 1968 | Japan | 43/91278 |
| Dec. 9, 1968 | Japan | 43/91279 |
| Dec. 9, 1968 | Japan | 43/91280 |
| Dec. 9, 1968 | Japan | 43/91281 |

[52] U.S. Cl. .............274/4 G, 179/100.2 Z, 242/199

[51] Int. Cl. ..............................................G11b 25/06

[58] Field of Search ................274/4 G; 179/100.2 Z; 242/197–200

[56] References Cited

UNITED STATES PATENTS

| | | | |
|---|---|---|---|
| 3,561,767 | 2/1971 | Negishi | 274/4 G |
| 3,492,005 | 1/1970 | Ueno | 274/4 B |
| 3,531,126 | 9/1970 | Tsukagoshi | 274/4 G |
| 3,532,347 | 10/1970 | Parsons | 274/4 G |

*Primary Examiner*—Leonard Forman
*Assistant Examiner*—Dennis A. Dearing
*Attorney*—Stevens, Davis, Miller & Mosher

[57] ABSTRACT

A magnetic recording and reproducing apparatus capable of recording and reproducing magnetic tapes accommodated in magnetic tape containers of different shapes, i.e., in both a tape cassette in which a tape is sent from one reel to another and an endless cartridge, which are selectively inserted into the apparatus.

5 Claims, 16 Drawing Figures

INVENTORS
KOZO YAMAMOTO,
TAKEHISA TAKAMIYA

BY
Stevens, Davis, Miller & Mosher
ATTORNEYS

MAGNETIC RECORDING AND REPRODUCING APPARATUS

The present invention relates to a magnetic recording and reproducing apparatus capable of recording and reproducing magnetic tapes accommodated in magnetic tape containers of different shapes, i.e., in both a tape cassette in which a tape is sent from one reel to another and an endless cartridge, which are selectively inserted into the apparatus.

Magnetic tape containers are generally classified into a tape cassette in which a tape is wound from one reel onto another and an endless cartridge in which a tape is transferred in an endless loop. These two types of magnetic tape containers are different from each other, not only in shape but also in the manner of engagement with a tape driving mechanism and with recording and reproducing members, such as a head and a capstan. It has, therefore, been customary to use a magnetic recording and reproducing apparatus specialized for each type of magnetic tape container.

An object of the present invention is to provide a novel magnetic recording and reproducing apparatus in which the above-described two different types of magnetic tape containers can selectively be used.

Another object of the present invention is to provide a magnetic recording and reproducing apparatus which comprises a casing accommodating the body of the apparatus and having formed therein an opening adapted for the insertion of a plurality of shapes of magnetic tape containers therethrough, and tape driving mechanisms provided in said casing and being capable of recording and reproducing the magnetic tapes contained in the respective magnetic tape containers by selectively cooperating therewith.

According to the present invention, magnetic tape containers of different shapes, i.e., a tape cassette and an endless cartridge, can be used for recording and reproduction with a single apparatus and, therefore, can selectively be used as required without necessitating the provision of a specialized apparatus of all. Moreover, the apparatus of the invention can be provided in a very small size since magnetic tape containers of different shapes can be inserted through a single insertion opening.

These objects, features and advantages of the present invention will be more clearly understood from the following detailed description when taken in conjunction with the accompanying drawings, in which.

Figure 2:
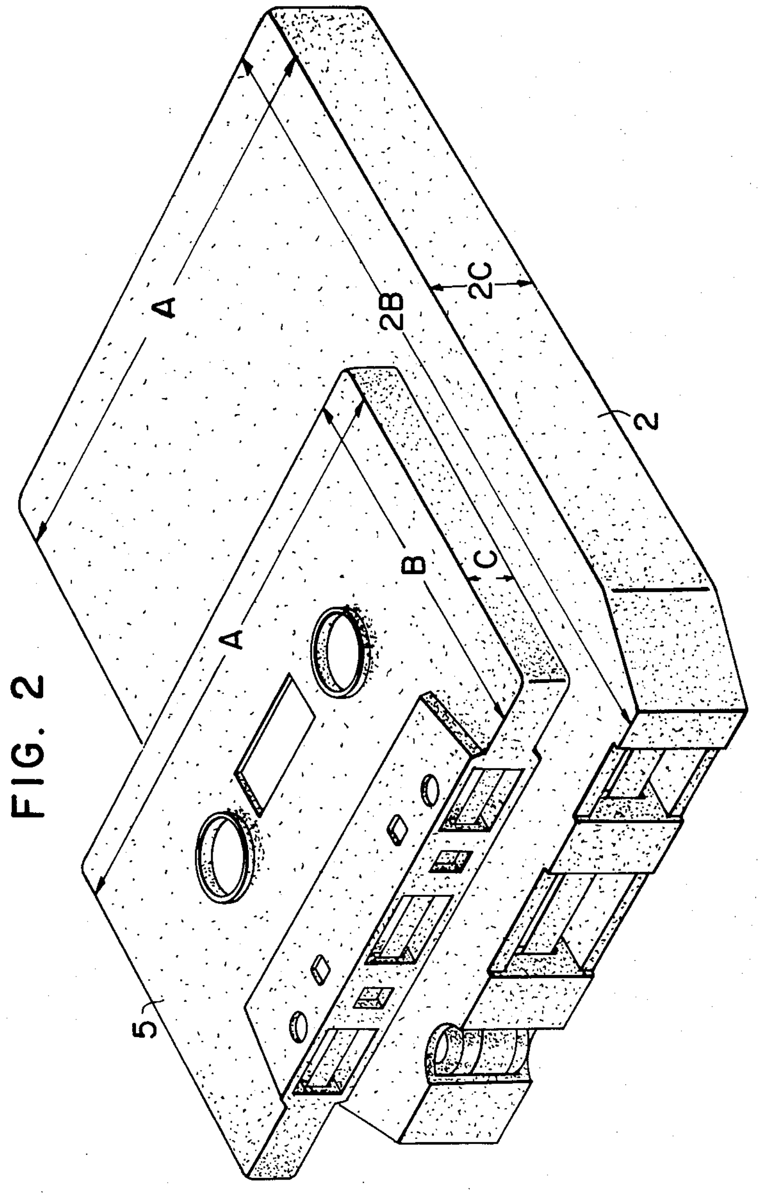
FIG. 2 is a perspective view showing, in comparison, magnetic tape containers to be used in the apparatus of the invention, i.e. a tape cassette and an endless cartridge.

The front panel of a casing 1 of the magnetic recording and reproducing apparatus is formed with an insertion opening 3 through which an endless cartridge 2 shown in FIG. 2 can be inserted, and is also provided with a volume control knob 4, a lamp 6 which will be turned on upon insertion of a tape cassette 5 shown in FIG. 2, and indication lamps **7*a*, 7*b*, 7*c* and 7*d* for indicating, for example, the operation program of the endless cartridge 2**.

Provided also on the front panel of the casing 1 are an operating lever 8 for manually changing the operation program and another operating lever 9 for ejecting the tape cassette from the apparatus.

The magnetic tape containers which can be used with the apparatus of the invention include the tape cassette 5 and the endless cartridge 2 as shown in FIG. 2. The tape cassette 5 and the endless cartridge 2 have substantially the same lateral width A, but the longitudinal width of the latter is about 2B with respect to the longitudinal width B of the former and the thickness of the latter is about 2C with respect to the thickness C of the former.

Therefore, it will be seen that if the insertion opening 3 formed in the casing 1 is of a size to permit the insertion of the endless cartridge 2, it will be large enough to permit the insertion of the tape cassette 5.

On the inside wall of the front panel of the casing 1 are provided two closure plates 10, 11 which normally close the insertion opening 3. The closure plate 10 is pivotably mounted by a pin 14, extending through cylindrical portions 12, 13 formed at the opposite ends of the upper edge of said closure plate, with the opposite ends thereof journaled in bearings 15 and 16 respectively at the upper portion of the insertion opening 3. Similarly, the closure plate 11 is pivotably mounted by a pin 19, extending through cylindrical portions 17, 18 formed at the opposite ends of the lower edge of said closure plate, with the opposite ends thereof journaled in bearings 20 and 21 respectively at the lower portion of the insertion opening 3.

Torsion springs 22 and 23 are mounted on the pins 14 and 19 respectively, with the opposite ends of the former bearing against the closure plate 10 and the inside wall of the casing 1 and the opposite ends of the latter bearing against the closure plate 11 and the inside wall of the casing 1. These torsion springs urge the closure plates 10 and 11 to close the upper half and the lower half portions of the insertion opening 3 from the inside respectively, whereby said insertion opening is normally closed as a whole.

Figures 3, 4:
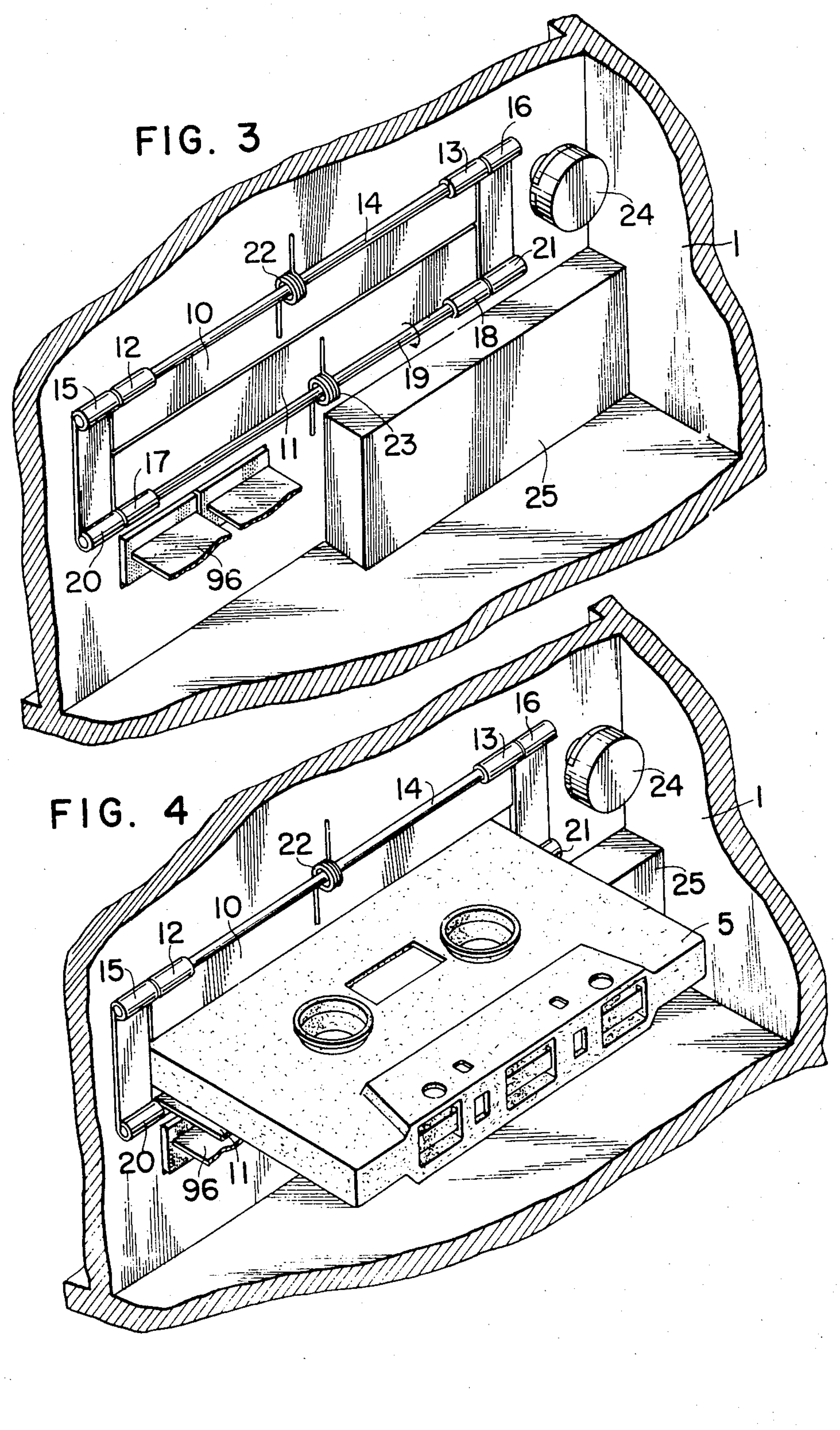
FIG. 3 is a perspective view of a magnetic tape container inserting portion of a casing of the apparatus as viewed from the inside of the apparatus.
FIG. 4 is a perspective view of a tape cassette inserted through the magnetic tape container inserting portion, as viewed from the inside of the apparatus.

Therefore, when the tape cassette 5 is inserted into the insertion opening 3 from the outside while sliding it on the lower edge of said insertion opening, the closure plate 11 is turned down by the leading end of said tape cassette 5 against the biasing force of the spring 23 and the cassette is mounted on a mechanism to be described later, whereas the closure plate 10 is held in its position closing the upper half portion of the insertion opening 3, as shown in FIG. 4.

Figure 5:
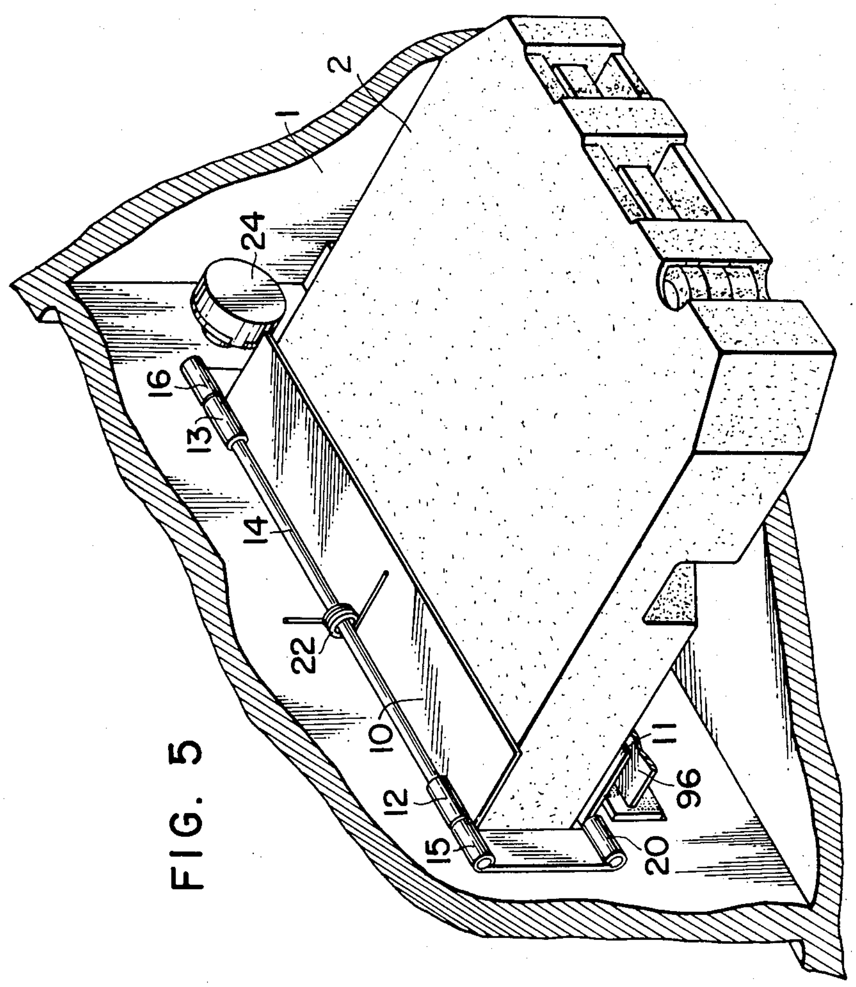
FIG. 5 is a perspective view of an endless cartridge inserted through the magnetic tape container inserting portion, as viewed from the inside of the apparatus.

On the other hand, when the endless cartridge 2 is inserted, both the closure plates 10 and 11 are turned open by the leading end of said endless cartridge against the baising forces of the springs 22 and 23, as shown in FIG. 5, thus providing for mounting of the endless cartridge 2 on the associated mechanism.

A volume control 24 to be operated by the knob 4 is mounted on the inside wall of the front panel, and the lamp 6 and the indication lamps 7*a*, 7*b*, 7*c* and 7*d* are protected by a cover 25.

Figure 6:
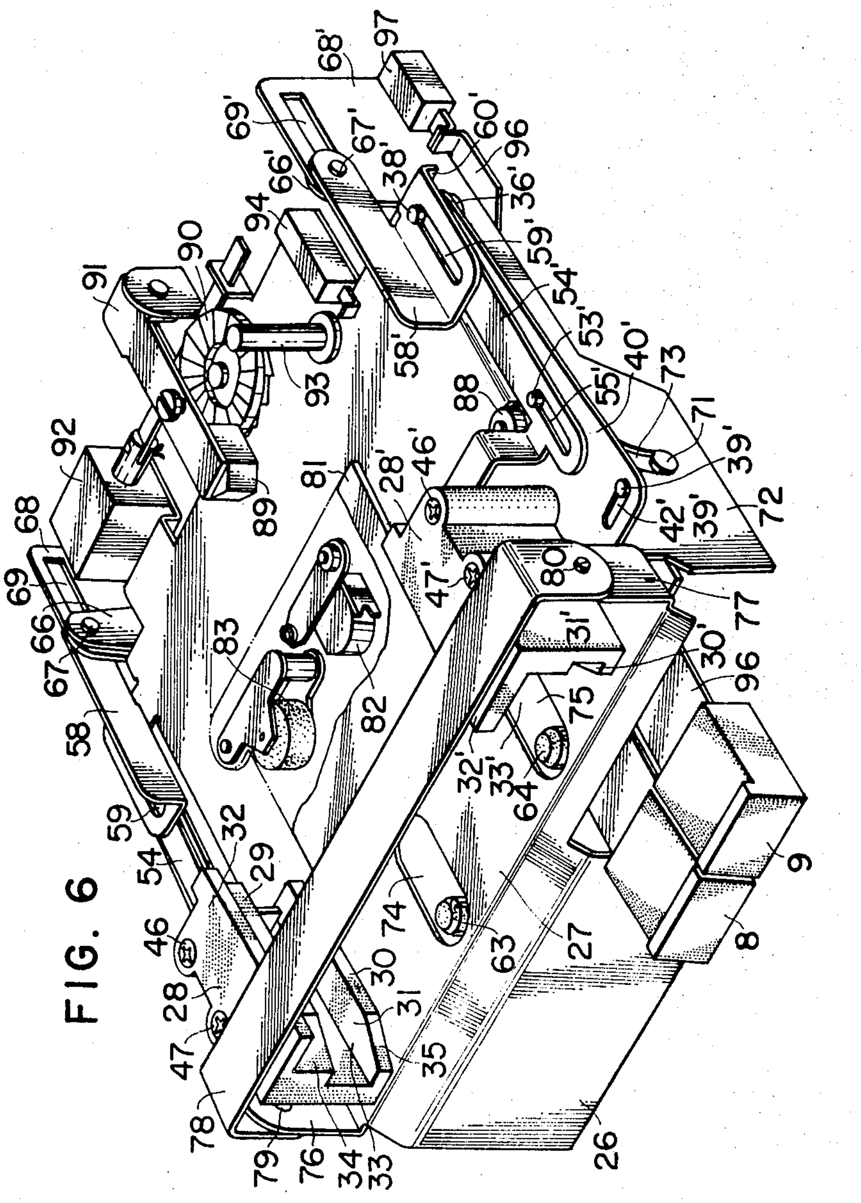
FIG. 6 is a perspective view of a mechanism of the apparatus, with no magnetic tape container mounted thereon.

Interior of the casing 1 is mounted a recording and reproducing mechanism as shown in FIG. 6.

As shown, various elements required for recording and reproduction of the tape cassette 5 or endless cartridge 2 mounted in the apparatus are mounted on a base plate 26 and the upper surface 27 of the front portion of said base plate is located at substantially the same level as the lower edge of the insertion opening 3.

Figure 9:
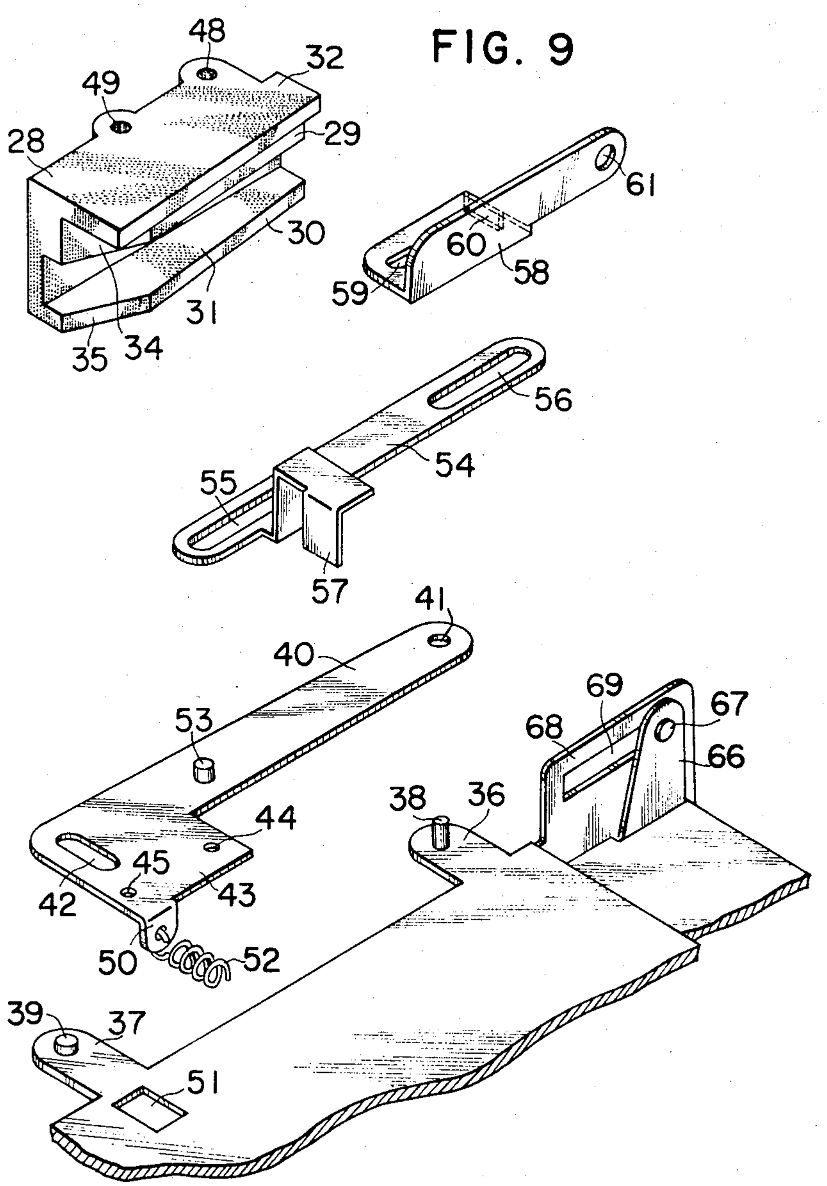
FIG. 9 is a perspective exploded view showing a magnetic tape container guiding portion on one side of the mechanism.

On both sides of the surface 27 of the base plate are provided guides 28, 28' respectively for guiding the tape cassette 5 and the endless cartridge 2 in the insertion of the same into the apparatus. Mechanisms associated with the guides 28, 28' are symmetrical with each other, so that only one of them, i.e., the one provided on the left side of the apparatus, will be explained with reference to FIG. 9. The parts of the right side mechanism, corresponding to those of the left side mechanism, are indicated by the same numerals suffixed with (').

The guide 28 has a substantially U-shaped configuration with a groove formed therein and the inside wall of said groove is stepped as at 29 to form a first guide portion 31 between the step 29 and the inner surface of a lower section 30 of said guide, and a second guide portion 33 between an upper section 32 of said guide and the upper surface of the base plate 26, said second guide portion 33 being deeper than said first guide portion 31. The first guide portion 31 guides the tape cassette 5 when said tape cassette is inserted in a horizontal position and the second guide portion 33 guides the endless cartridge 2 when said endless cartridge is inserted in a horizontal position.

The forward ends of the step 29 and the lower section 30 of the guide 28 are cut obliquely to form tapers 34, 35 respectively.

Lugs 36 and 37 are formed at each side edge of the base plate 26 with a predetermined distance therebetween and pins 38, 39 are provided on said lugs respectively. A substantially L-shaped swing lever 40 is provided with a hole 41 in the rear end portion of a longer arm thereof and a slot 42 in the forward end portion of a shorter arm or a latch arm 43, which extends in a direction at right angles to the longer arm. This swing lever 40 is mounted with the pin 38 received in the hole 41 and the pin 39 received in the slot 42, so as to be swingable about said pin 38.

The guide 28 is securely mounted on the swing lever 40 by tightening bolts 46, 47 which extend through holes 48, 49 formed in said guide and internally threaded holes 44, 45 formed in the shorter arm 43 of said swing lever respectively.

The swing lever 40 is also formed with a lug 50 projecting downwardly form the latch arm 43. The lug 50 extends downwardly through a hole 51 formed in the base plate 26 and one end of a spring 52 is anchored to said lug 50, the other end of said spring being anchored to a similar lug formed on the latch arm 43' of the swing lever 40' provided on the other side of the apparatus. Thus, it will be seen that the swing levers 40, 40' and the guides 28, 28' are biased toward each other by the spring 52.

The arrangement is made such that in this condition the confronting surfaces of the first guide portions 31, 31' of the respective guides 28, 28' define a space providing for insertion of the tape cassette 5 in a transverse direction thereof, by the engagement of the pins 39, 39' with the outer ends of the slots 42, 42' respectively.

A sliding lever 54 has slots 55, 56 formed in the opposite end portions thereof and is mounted with a pin 53, provided at the central portion of the swing lever 40, and the pin 38 on the base plate 26 received in said slots 55, 56 respectively, for sliding movement in a longitudinal direction thereof. The sliding lever 54 is provided with an abutment 57 projecting from one side thereof and the sliding lever 54' on the other side of the apparatus is also provided with a similar abutment 57'. These abutments 57, 57' will abut against the leading end surface of the tape cassette 5 when said tape cassette is inserted into the first guide portions 31, 31' of the respective guides 28, 28'.

Further, a connecting lever 58 is mounted on the pin 38 with said pin received in a slot 59 formed therein, for sliding movement in a longitudinal direction thereof. The connecting lever 58 is formed with a downwardly bent lug 60 at the rear end thereof, which is opposed by the rear end of the sliding lever 54.

Figure 8:
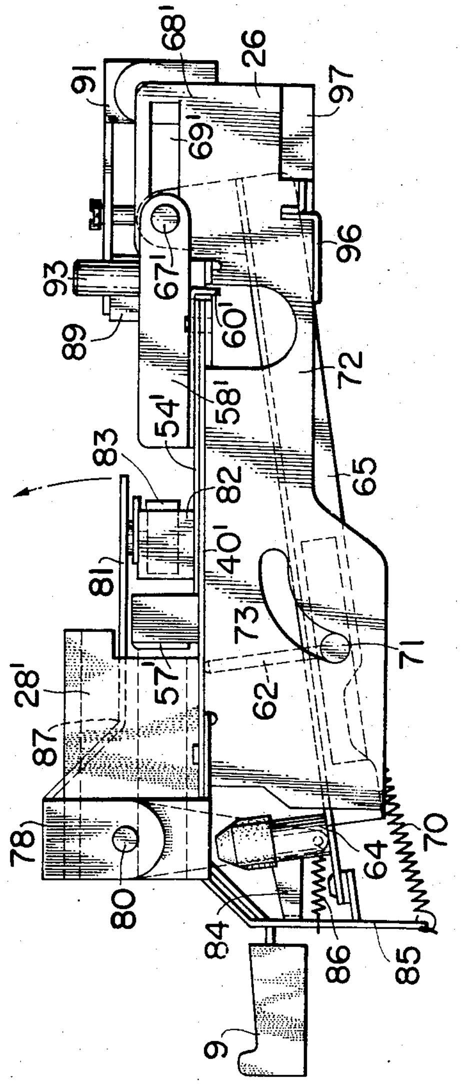
FIG. 8 is a side view of the mechanism in the condition shown in FIG. 6.

On the other hand, a connecting member 66 is provided at the rear end of a driving unit 65 which is mounted below the base plate 26 and includes a capstan 62 and reel shafts 63, 64 for the tape cassette 5, and the connecting lever 58 is connected with said connecting member 66 by a pin 67 extending through a hole 61 formed therein and a slot 69 formed in an upwardly bent lug 68 of the base plate 26, as shown in FIGS. 6 and 8.

The driving unit 65 is constantly urged downwardly at its front end by a spring 70 and a pin 71 projecting outward from the central portion of the side wall of said driving unit is received in an arcuate slot 73 formed in the side wall 72 of the base plate.

Under normal condition, the driving unit 65 is held stationary with the pin 71 being in engagement with the lower end of the arcuate slot 73, as shown in FIG. 8, under the biasing force of the spring 70 and, therefore, the connecting ever 58 is located in its forward position with the pin 67 being in engagement with the forward end of the slot 69.

In this condition, the capstan 62 and the reel shafts 63, 64 provided on the driving unit 65 are located below the surface of the base plate 26. However, when the driving unit 65 is moved upward, incident to backward movement of the connecting lever 58, along the arcuate slot 73 in the side wall 72 of the base plate 26 against the biasing force of the spring 70, the capstan 62 is projected above the base plate 26 through a hole (not shown) formed in said base plate, and the reel shafts 63, 64 are also projected above the base plate 26 through holes 74, 75 formed in said base plate.

Upon completion of the upward movement, the driving unit 65 is retained in its position by means of a locking mechanism (not shown). The driving unit 65 can be released from the locked state by pushing the operating lever 9, whereupon it is lowered by the spring 70 to the original position.

An angle 78 is pivotably connected to upwardly bent lugs 76, 77 by pins 79, 80, which lugs are formed at both sides of the front end of the base plate 26, and a head plate 81 is connected to the central portion of said angle 78 integrally therewith. Recording and reproducing elements, such as a magnetic head 82 and a pinch roller 83, for the tape cassette 5 are mounted on the underside surface of the head plate 81, that is, the surface confronting the upper surface of the base plate 26.

The head plate 81 is flexed as at 87 so that when the tape cassette 5 is inserted into the first guide portions 31, 31' of the guides 28, 28', the head 82 and the pinch roller 83 may be brought into engagement with a magnetic tape accommodated in said tape cassette and further the pinch roller 83 is brought into pressure contact with the capstan 62 projecting upward incident to the upward movement of the driving unit 65.

In order to hold the magnetic head 82 and the pinch roller 83 in the positions described above, a projection 84 formed at an extension of one end of the angle 78 is held in abutment against a front wall of the base plate 26 under the biasing force of a spring 86.

Figure 7:
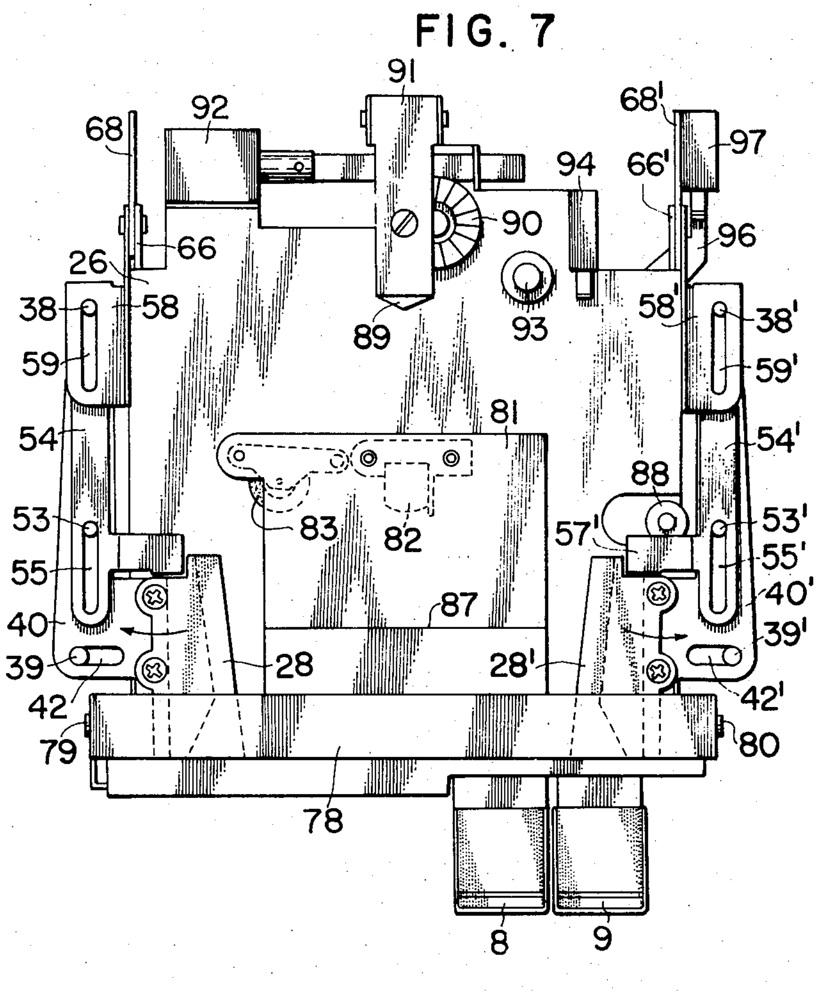
FIG. 7 is a top plan view of the mechanism in the condition shown in FIG. 6.

A retainer roller 88 for retaining the endless cartridge 2 inserted into the second guide portions 33, 33' is located on the right side of the central portion of the base plate 26 as shown in FIG. 7. This retainer roller 88 is moved to the left by the endless cartridge 2 inserted and urges said endless cartridge inwardly. A magnetic head 89 which will be brought into contact with a magnetic tape accommodated in the endless cartridge 2 upon insertion of said endless cartridge is mounted on a head mounting plate 91 which is provided at the rear end portion of the base plate 26 and movable vertically by the action of a stepped cam 90. The stepped cam is intermittently rotated by a plunger 92 to move the head mounting plate 91, whereby the magnetic head 89 is moved vertically to change the playing program for the tape in the cartridge 2.

A capstan 93 which will engage a pinch roller mounted in the endless cartridge 2 is provided projecting from the base plate 26 in side-by-side relation to the magnetic head 89. A switch 94 is also provided on the base plate 26, which is switched upon insertion of the endless cartridge 2.

Figure 16:
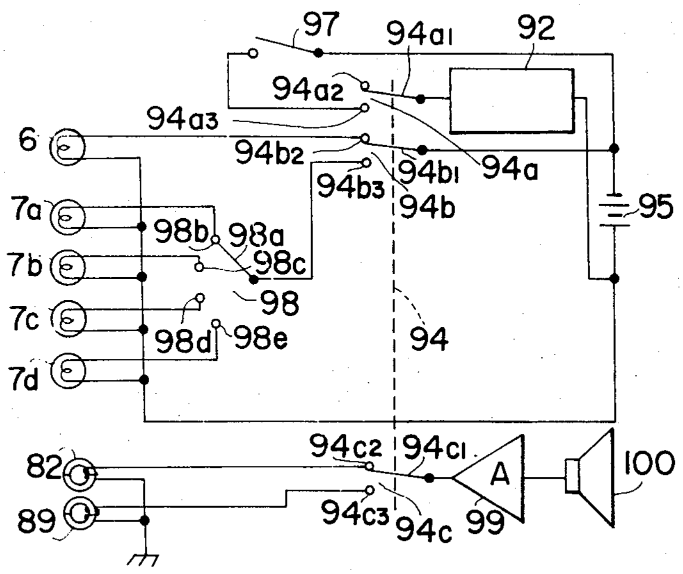
FIG. 16 is an electric circuit diagram of the apparatus.

As shown in FIG. 16, the switch 94 has three switching circuits associated with each other. One of the switching circuits **94*a* is connected to a power source 95 to form a parallel circuit with a switch 97 which is closed by a lever 96 when said lever is moved by pushing the operating lever 9. Under normal conditions, a movable contact $94a_1$ of the switch 94a is held in contact with a fixed contact $94a_2$, whereby said switch maintained the circuit open together with a switch 97. Another switching circuit 94*b* is provided to control the lamp 6 and the indication lamps 7*a*, 7*b*, 7*c* and 7*d* provided on the front panel of the casing 1. Namely, a movable contact $94b_1$ of the switch 94*b* is normally held in contact with a fixed contact $94b_2$ to connect the lamp 6 with the power source 95. Another fixed contact $94b_3$ is connected to a movable contact 98*a* of a switch 98 which is controlled by the rotation of the stepped cam 90**.

Still another switching circuit **94*c* is provided for switching the connection from the magnetic head 82 for the tape cassette 5 to the magnetic head 89 for the endless cartridge 2 or vice versa. A movable contact $94c_1$ of the switch 94*c* is normally connected to a fixed contact $94c_2$ to connect the magnetic head 82 with an amplifier 99 but is brought into contact with a fixed contact $94c_3$, upon a switching operation, to connect the magnetic head 89 with the amplifier 99. A speaker 100 is energized by the output of the amplifier 99**.

When the magnetic head 89 scans the first program of the tape in the endless cartridge 2 under the action of the stepped cam 90, the movable contact 98a of the switch 98, controlled by the rotation of said stepped cam, engages the fixed contact **98*b* to connect the indication lamp 7a with the power source, whereas when the magnetic head 89 is shifted to scan the second program, the movable contact 98*a* engages the fixed contact 98*c* to connect the indication lamp 7*b* with the power source 95. Similarly, the indication lamp 7*c* is connected with the power source through the fixed contact 98*d* in case of the third program and the indication lamp 7*d* is connected with the power source through the fixed contact 98*e*** in case of the forth program.

Track change of the endless cartridge 2 is effected in two cases, namely one is the case wherein the track is shifted automatically by the action of the plunger 92 when said plunger is energized upon shorting of the contacts, for example, by a metal foil provided on the tape in said endless cartridge, and another is the case wherein the track is shifted by manually pushing the operating lever 8, whereupon the switch 97 is closed to energize the plunger 92.

Figure 1:
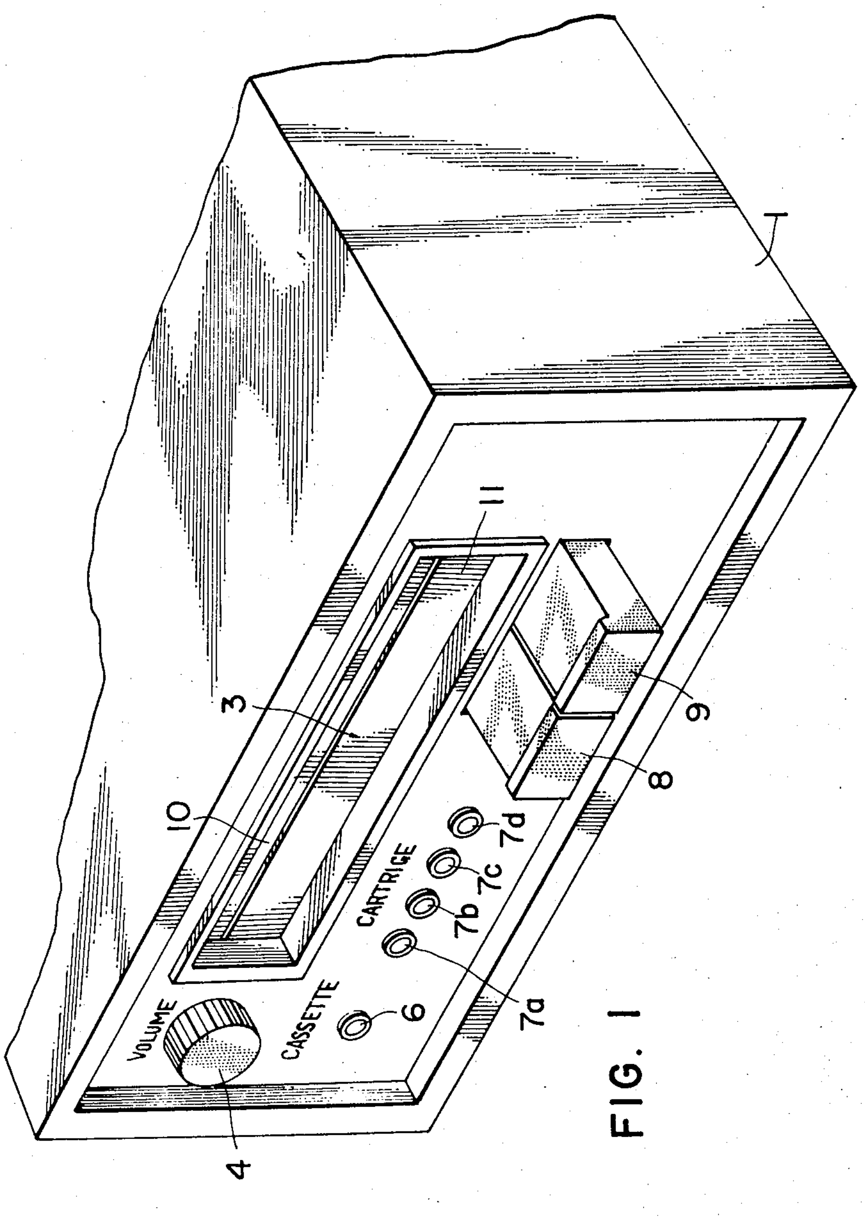
FIG. 1 is a perspective view of an embodiment of the magnetic recording and reproducing apparatus according to the present invention.

The magnetic recording and reproducing apparatus constructed as described above will operate in the following manner:

First of all, the insertion opening 3 in the casing 1 is normally closed by the closure plates 10, 11 as shown in FIGS. 1 and 3. The first guide portions 31, 31' are held in the positions to provide for insertion of the tape cassette 5, and the magnetic head 82 and the pinch roller 83 for said tape cassette are located opposite to the first guide portions 31, 31'. On the other hand, the driving unit is in its lowered position, with the capstan 62 and the reel shafts 63, 64 located below the surface of the base plate 26.

The operation of recording or reproducing a tape accommodated in the tape cassette 5 from the above-described normal condition will be explained first.

When the tape cassette 5 is inserted into the insertion opening 3 from the outside of the casing 1, along the lower edge of said insertion opening, the lower closure plate 11 is caused to make a pivotal movement in the direction of the arrow shown in FIG. 3 by the leading end face of the tape cassette, against the biasing force of the spring 23, and is laid along the underside surface of the tape cassette 5 as shown in FIG. 4, providing for insertion of said tape cassette.

In this case, the upper closure plate 10 does not undergo the action of the tape cassette 5 and remains in its closed position.

Upon insertion of the tape cassette 5 in the manner described, the lower half portion of the insertion opening 3 is occupied by the tape cassette, while the upper half portion thereof is closed by the closure plate 10. Therefore, the interior of the apparatus is isolated from the outside and there is no fear of dust and dirt, etc. intruding into the apparatus under such condition.

Figure 10:
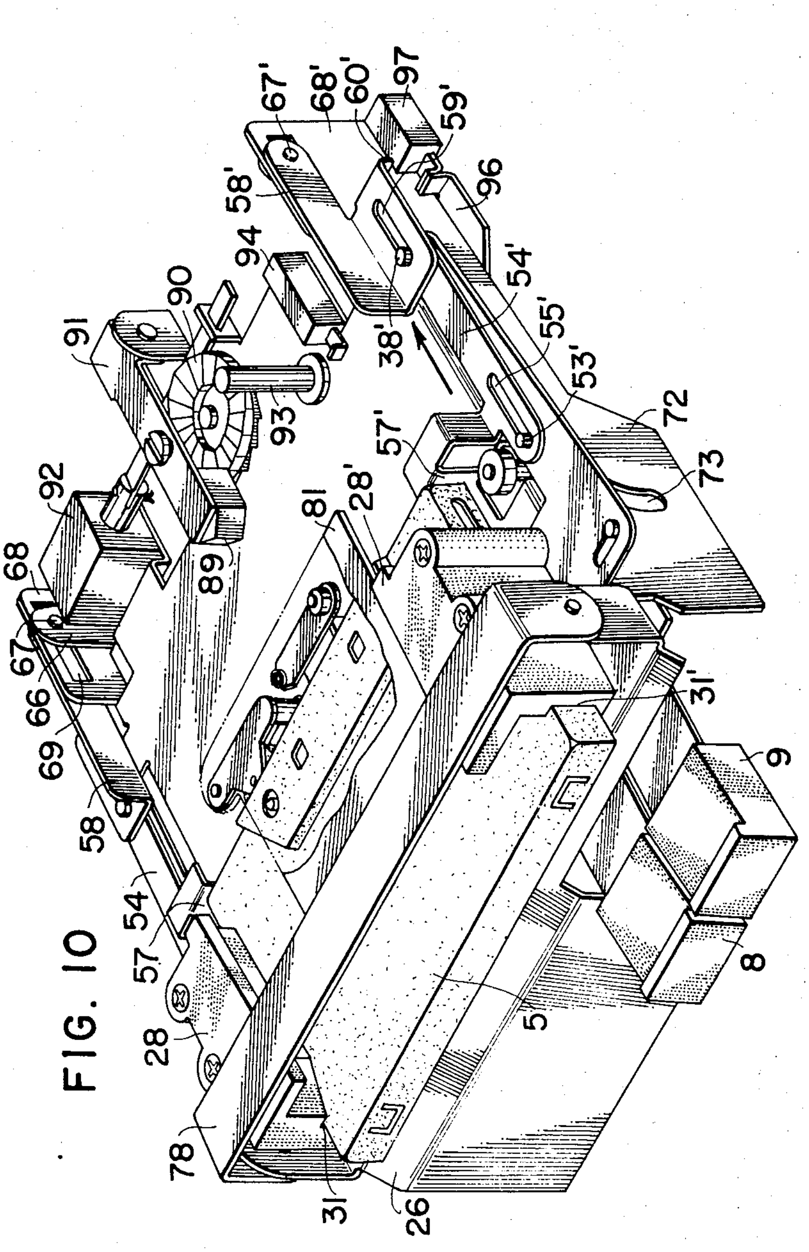
FIG. 10 is a perspective view of the mechanism with a tape cassette mounted thereon.
Figure 11:
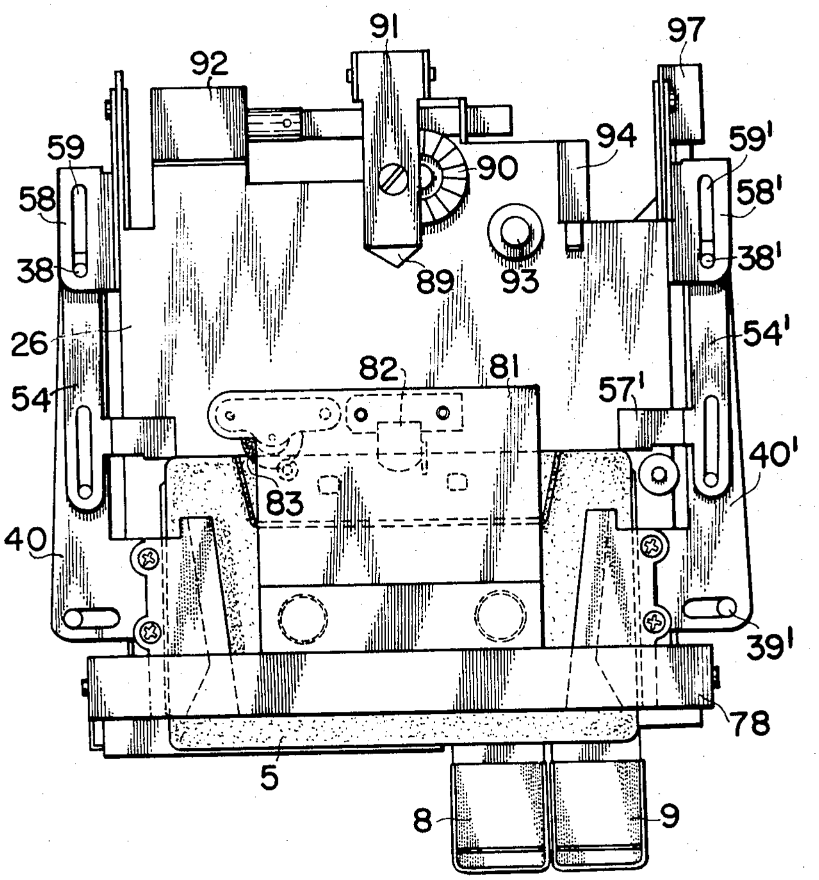
FIG. 11 is a top plan view of the mechanism in the condition shown in FIG. 10.

The tape cassette 5 inserted through the insertion opening 3 proceeds with the opposite sides thereof being guided by the first guide portions 31, 31′ of the guides 28, 28′ and the leading end face thereof abuts against the abutments 57, 57′ provided on the sliding levers 54, 54′. As the tape cassette 5 further proceeds, the sliding levers 54, 54′ are caused to slide backward from the position of FIG. 6 in the direction of the arrow shown in FIG. 10. Therefore, the connecting levers 58, 58′ are also caused to slide backward by the rear ends of the sliding levers 54, 54′ which engage the downwardly bent lugs 60, 60′ of said connecting levers respectively.

As a result, the connecting members 66, 66′ of the driving unit 65 are moved backward, which are connected with the connecting levers 58, 58′ by means of the pins 67, 67′ respectively, so that said driving unit 65 is moved rearwardly upwardly against the biasing force of the spring 70, with the pin 71 sliding in the arcuate slot 73. Namely, the driving unit 65 is moved from the position of FIG. 8 to the position of FIG. 12 to be in contact with the base plate 26.

As the driving unit 65 is moved upward as described above, the capstan 62 and the reel shafts 63, 64 provided thereon are gradually projected above the base plate 26 and brought into engagement with the tape cassette 5 being inserted while being guided by the first guide portions of the guides.

With the capstan 62 and the reel shafts 63, 64 in engagement with the tape cassette 5, the tape in said tape cassette is held in contact with the magnetic head 82 and the pinch roller 83, and particularly the pinch roller 83 is pressed against the capstan 62 provided in the tape cassette 5, pinching the tape therebetween.

This condition is maintained even after the operation of inserting the tape cassette is terminated because the driving unit 65 is held in position by the locking mechanism.

The recording or reproduction of the tape cassette 5 can be commenced automatically by arranging, for example, such that the tape driving system and the electrical system may automatically be energized by a switch (not shown) which is actuated in association with the tape cassette inserting operation. Alternatively, the recording and reproduction may be commenced manually.

Upon completion of the recording or reproduction of the tape cassette 5 by the operation described above, the tape cassette can be removed from the apparatus by pushing the operating lever 9. Namely, when the operation lever 9 is pushed, the driving unit 65 is released from the locking and returned to the original lower position under the biasing force of the spring 70. In this case, both the connecting levers 58, 58′ and the sliding levers 54, 54′ are moved forward, so that the tape cassette 5 is pushed outward incident to the forward movement of said sliding levers 54, 54′. Thus, the tape cassette can be removed from the insertion opening 3.

In this case, the tape cassette 5 is smoothly pushed by the abutments 57, 57′ of the sliding levers 54, 54′, since the capstan 62 and the reel shafts 63, 64 are moved down from the surface of the base plate 26 incident to the downward movement of the driving unit 65.

In the above-described operation of recording or reproducing the tape cassette 5, the retainer roller 88 for retaining the endless cartridge 2 does not interfere with the insertion of the tape cassette as it is located in its right side position. Further, since the tape cassette 5 is retained in the recording and reproducing position by the forward portion of the base plate 26, the switch 94 is not actuated and, therefore, the electrical system of the apparatus remains in the position shown in FIG. 16. Thus the lamp 6 is turned on in the process of recording or reproduction of the tape cassette, 5, indicating that the tape cassette is in use.

On the other hand, the plunger 92 will not be energized even if the switch 97 is closed by pushing the operating lever 8 during use of the tape cassette 5, because the circuit of the switch 94*a* is open.

Now, the operation of the apparatus for recording and reproducing the endless cartridge 2 will be described hereunder:

When the endless cartridge 2 in inserted through the insertion opening 3 from the outside of the apparatus, in the normal condition shown in FIGS. 1, 3 and 6 to 8, the closure plates 10 and 11 are turned up and down by the leading end face of said cartridge against the biasing forces of the springs 22 and 23 respectively, and are laid along the upper and lower surfaces of said endless cartridge, providing for insertion of the endless cartridge.

Figure 14:
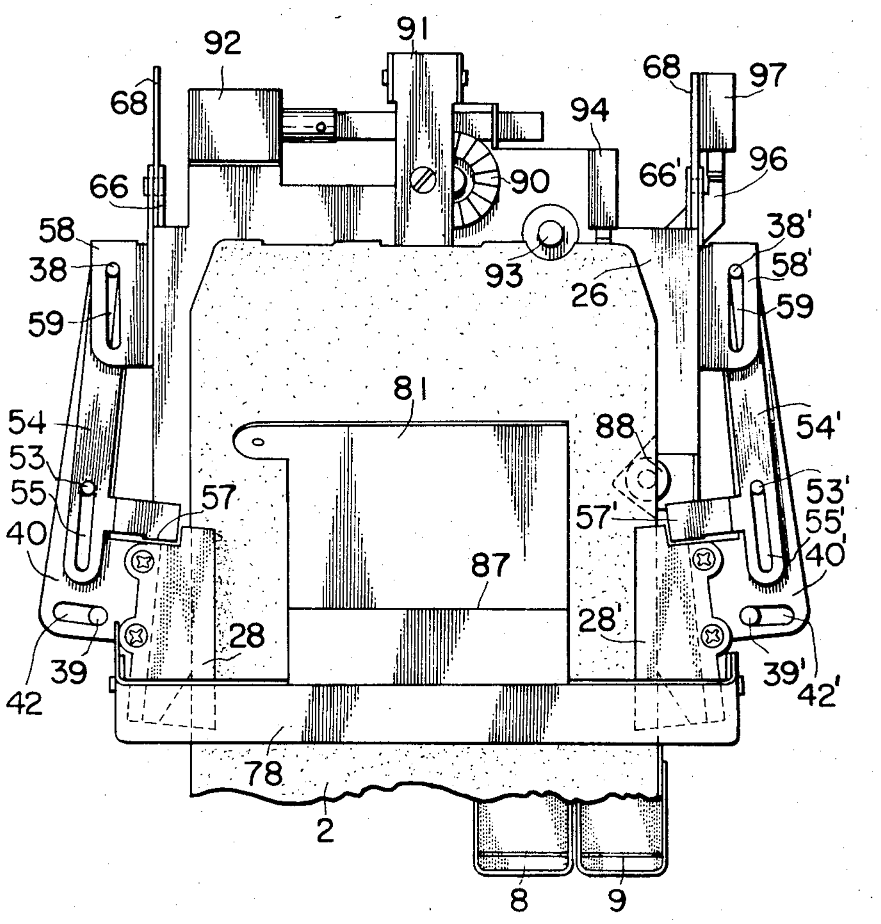
FIG. 14 is a top plan view of the mechanism in the condition shown in FIG. 13.

From the insertion opening 3, the endless cartridge 2 is inserted into the second guide portions 33, 33′ formed between the upper sections 32, 32′ of the guides 28, 28′ and the upper surface of the front end portion of the base plate 26. In this case, both sides of the leading end face of the endless cartridge 2 abut against the tapered portions 34, 34′ and 35, 35′ of the guides 28, 28′ and, as the endless cartridge is further inserted, the guides 28, 28′ and therefore the swing levers 40, 40′ fixed to said guides are caused to pivot about the pins 38, 38′ against the biasing force of the springs 52, 52′ respectively in an outward direction, i.e., the direction of the arrow shown in FIG. 7, and thus provides for insertion of the endless cartridge 2 as shown in FIG. 14.

Figures 12, 15:
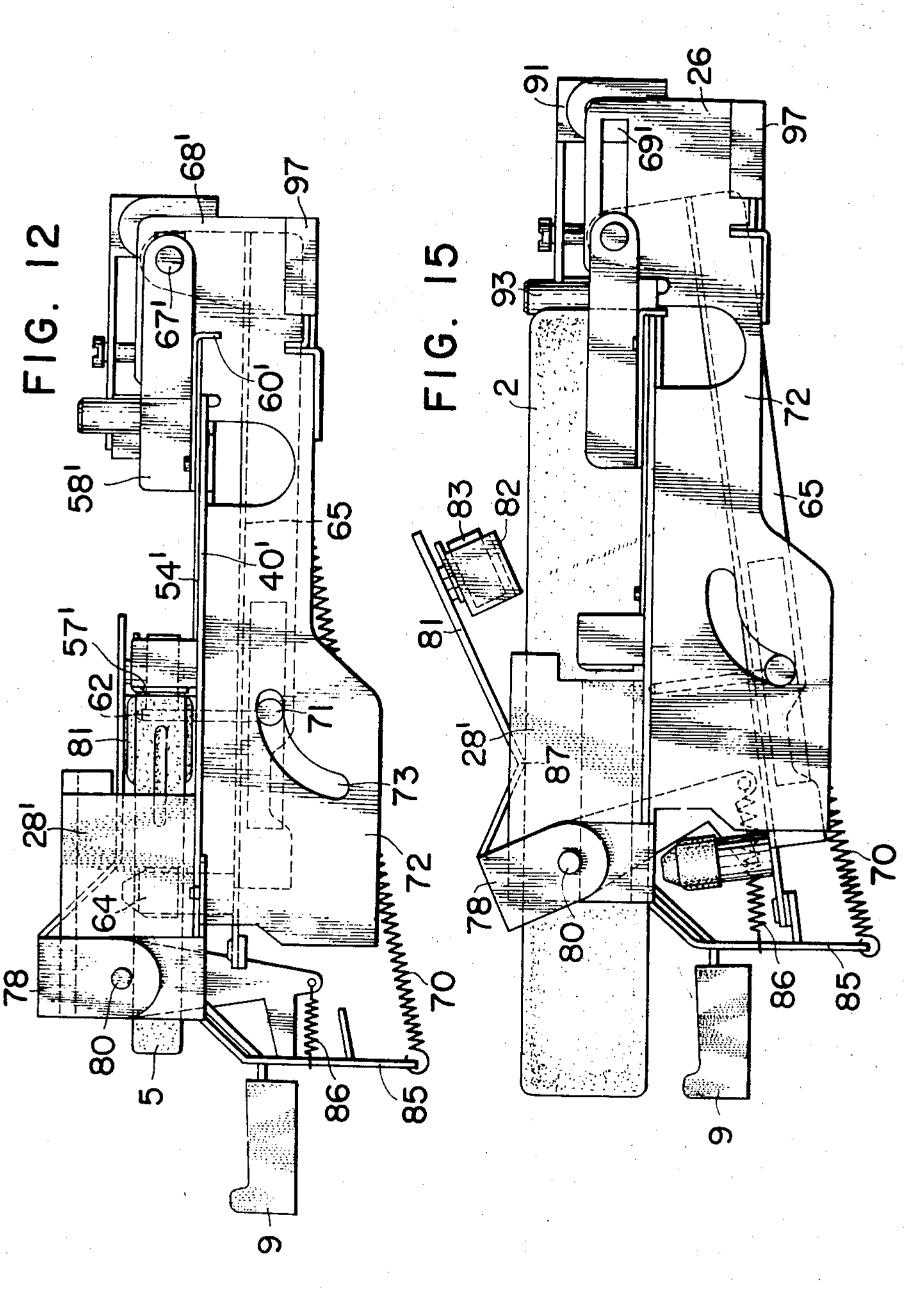
FIG. 12 is a side view of the mechanism in the condition shown in FIG. 10.
FIG. 15 is a side view of the mechanism in the condition shown in FIG. 13.
Figure 13:
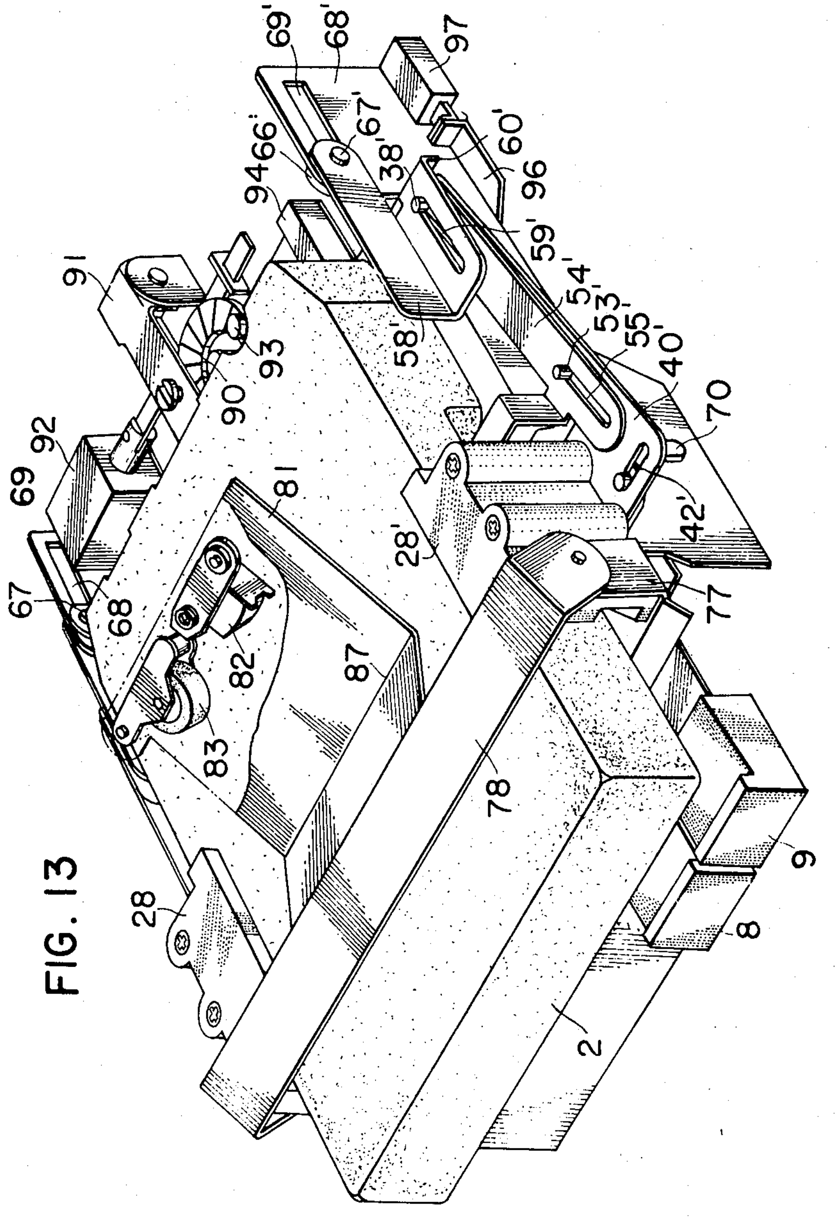
FIG. 13 is a perspective view of the mechanism, with an endless cartridge mounted thereon.

On the other hand, in the process of inserting the endless cartridge 2, the upper edge of the leading end of the endless cartridge abuts against the flexed portion 87 of the head plate 81, causing said head plate to pivot in the direction of the arrow shown in FIG. 8, together with the angle 78, against the biasing force of the spring 86. Thus, the magnetic head 82 and the pinch roller 83 mounted on the head plate 81 are lifted as shown in FIG. 15.

As described above, the endless cartridge 2 inserted from the insertion opening 3 proceeds into the apparatus while urging the first guide portions 31, 31' outwardly in sliding engagement therewith which guide portions are used for guiding the tape cassette 5, and lifting the magnetic head 82 and the pinch roller 83 for the tape cassette upwardly by the upper surface thereof, and is finally set in the recording and reproducing position.

In this case, the abutments 57, 57' are cleared from the path of the endless cartridge and do not interfere with the insertion of said cartridge, because the sliding levers 54, 54' on which said abutments are provided are also caused to pivot outwardly about the pins 38, 38' respectively, incident to the outward pivotal movement of the swing levers 40, 40' about the pins 38, 38'. For the same reason, the driving unit 65 is not caused to move upward but is retained in its lowered position.

When the endless cartridge 2 has been inserted in the manner described and particularly when the tape in said cartridge has been brought into engagement with the magnetic head 89 and the capstan 93 as shown in FIG. 14, the switch 94 is concurrently actuated by the leading end face of the cartridge and the retainer roller 88 is moved to the left, for example, by a mechanism (not shown) which is operated in association with the operation of inserting the cartridge. The retainer roller 88 thus moved to the left fits into a recess with pressure which is formed in the cartridge and holds the cartridge so as to maintain the engagement of the tape with the head 89 and the capstan 93 and the position of the switch 94.

The recording or reproduction of the endless cartridge 2 can be commenced automatically upon insertion of said cartridge by arranging, for example, such that the tape driving system and the electrical system of the apparatus may automatically be energized by a switch which is actuated in association with the cartridge inserting operation, similar to the case of the tape cassette 5.

The electric circuit of the apparatus is previously set such that when the switch 94 is switched by the endless cartridge 2 inserted into the apparatus in the manner described, the switch **94*a* will close the circuit connecting the switch 97 with the plunger 92 so that said plunger may be energized upon operating the operating lever 8; the switch 94*b* will switch the connection with the power source from the lamp 6 to the indication lamps 7*a*, 7*b*, 7*c* and 7*d* to turn on the same; and the switch 94c will switch the connection from the magnetic head 82 for the tape cassette to the magnetic head 89** for the endless cartridge.

If the arrangement is made such that the magnetic head 89 is placed by the stepped cam 90 in a position to scan one of several programs set on the tape when the switch **94*b* is switched, the lamp corresponding to said specific program will be turned on. For instance, when the magnetic head 89 is previously set by the stepped cam 90 to scan the second program, the movable contact 98*a* of the switch 98 is in contact with the fixed contact 98*c*, so that the lamp 7*b* is turned on upon completion of the insertion of the endless cartridge 2. Similarly, when the magnetic head 89 is set to scan the third program, the lamp 7*c*** is turned on and when the magnetic head is set to scan the other program, the lamp corresponding to the specific program to be scanned is turned on.

In the manner described, it is possible to record or reproduce the endless cartridge 2, to turn on the lamp corresponding to the program in operation, to automatically operate the plunger 92 to shift the program from the first to the second program (though this case is not illustrated in the drawings), and to change the program by manually operating the operating lever 8 and energizing the plunger 92 through the switch 97.

The endless cartridge 2 can be removed from the apparatus by pulling it at the rear end portion thereof. Namely, when the endless cartridge 2 is pulled with a force sufficient to cause the retainer roller 88 to move to the right against its biasing force, said retainer roller is returned to its original position, so that the cartridge is released from the retaining force and can be easily removed from the apparatus.

Incident to the cartridge removing operation, the switch 94 is deenergized, so that the switches **94*a*, 94*b* and 94*c* are returned to their original positions shown in FIG. 16. Further, the head plate 81 is returned to its original position under the force of the spring 86 since the upward force is removed from the flexed portion 87 of said head plate, and the guides 28, 28' and the mechanisms associated therewith are also returned to their original positions under the biasing forces of the springs 52** since the cartridge is disengaged from said guides.

What is claimed is:

1. A magnetic recording and reproducing apparatus for selectively playing one of a tape cassette and an endless cartridge, comprising a casing having an opening formed therein capable of receiving any one of a tape cassette and an endless cartridge; guide means having first and second guide portions, said guide means being normally positioned at a first position where said first guide portion defines a first playing position for a tape cassette and being moved, upon insertion of an endless cartridge through said opening, to a second position where said second guide portion defines a second playing position for an endless cartridge; a movable member engageable with a tape cassette inserted into said first playing position for movement thereof; a tape driving mechanism normally positioned at an initial position spaced from said first and second playing positions and being engaged with said movable member so as to be moved with the movement thereof into an operative position where said driving mechanism is engaged with the tape cassette mounted at said first playing position for driving the same, means for disengaging said movable member from said tape driving mechanism when said guide means are moved to said second position thereof thereby retaining said tape driving mechanism at said initial position when an endless cartridge is inserted into said second playing position, first head means for recording and reproducing an inserted tape cassette normally disposed to be engageable for playing with an inserted tape cassette and movable outwardly of said second playing position upon insertion of an endless cartridge, second head means for recording and reproducing an inserted endless cartridge and means for driving said endless cartridge.

2. A magnetic recording and reproducing apparatus according to claim 1, wherein said first playing position is substantially aligned with said opening so as to enable a tape cassette to be inserted through said opening into said first playing position where the inserted tape cassette is held by said guide means for recording and reproducing, and said second playing position is substantially aligned with said opening so as to enable an endless cartridge to be inserted through said opening into said second playing position where the inserted endless cartridge is held by said guide means for recording and reproducing.

3. A magnetic recording and reproducing apparatus according to claim 1, further comprising a closure means for closing said opening, said closure means including a first portion which is movable to permit a tape cassette to be inserted through said opening, and a second portion which is movable together with said first portion to permit an endless cartridge to be inserted through said opening.

4. A magnetic recording and reproducing apparatus according to claim 1, further comprising an electric circuit being normally co-operative with a mounted tape cassette for recording and reproducing said mounted tape cassette, and being changeable to be co-operative with a mounted endless cartridge for recording and reproducing said mounted cartridge, and switching means for changing said electric circuit to be co-operative with said mounted endless cartridge upon mounting said endless cartridge.

5. A magnetic recording and reproducing apparatus according to claim 1, wherein said head means comprise a head plate movably mounted on said casing, a magnetic head fixed on a surface of said head plate and a pinch roller fixed on the same surface, said head plate being normally positioned so as to align said magnetic head and said pinch roller with said first playing position thereby enabling them to be engaged for recording and reproducing with the tape of a mounted tape cassette, and, when and endless cartridge is inserted through said opening into said second playing position, being engaged with said inserted endless cartridge thereby being moved so as to place said magnetic head and said pinch roller spaced from said second playing position.

* * * * *